Dec. 4, 1923.

A. G. SIEBENLIST

THERMOSTAT FOR OVENS

Filed Sept. 30, 1922

1,476,377

Witness:
Erwin B. Eiring

Inventor:
Anthony G. Siebenlist
By
Attorneys

Patented Dec. 4, 1923.

1,476,377

UNITED STATES PATENT OFFICE.

ANTHONY GEORGE SIEBENLIST, OF ALOIS, WISCONSIN.

THERMOSTAT FOR OVENS.

Application filed September 30, 1922. Serial No. 591,540.

*To all whom it may concern:*

Be it known that I, ANTHONY GEORGE SIE-BENLIST, a citizen of the United States, and resident of Alois, in the county of Milwaukee and State of Wisconsin, have invented certain new and useful Improvements in Thermostats for Ovens; and I do hereby declare that the following is a full, clear, and exact description thereof.

This invention relates to thermostats for ovens or heating devices, and is particularly directed to a device for controlling the flow of fuel to such ovens.

In thermostats, as heretofore constructed, considerable difficulty has been experienced, due to the fragile or delicate construction followed, and due also to the relatively large change in the physical character of the parts for temperature changes, with the consequent inability of the parts to regain their original condition, thereby producing inaccuracies of control.

This invention is designed to overcome the above noted defects and has for its objects, therefore, the provision of a thermostat in which accurate control is continuously attained, in which relatively small changes in the physical state of the parts are utilized, and in which a long life is attained.

Further objects are to provide a thermostat which may be readily initially adjusted, which may be easily controlled or set at the desired temperature, which is composed of a small number of parts and of such a character that the likelihood of their getting out of order is minimized, and which may be easily adjusted for right or left hand positioning.

A further object is to provide a thermostat which may be cheaply produced by the ordinary machine shop methods.

An embodiment of the invention is shown in the accompanying drawings, in which:—

Figure 1:
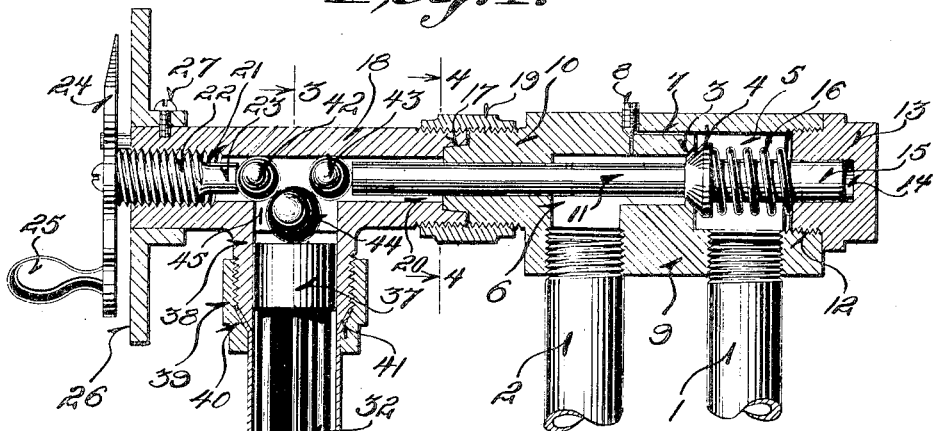
Figure 1 is a sectional view through the thermostatic device.
Figure 2:
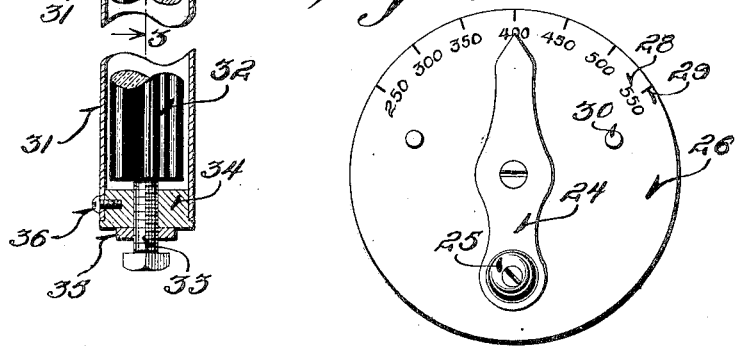
Figure 2 is a view of the dial and the manually movable pointer.
Figure 3:
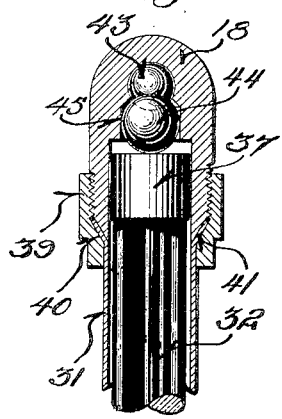
Figure 3 is a section on the line 3—3 of Figure 1.
Figure 4:
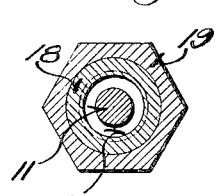
Figure 4 is a section on the line 4—4 of Figure 1.
Figure 5:
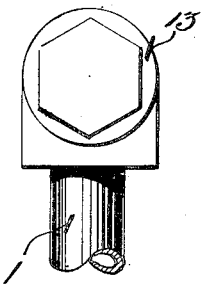
Figure 5 is a rear elevation of the device.

Referring more particularly to the drawings, it will be seen that the supply pipe 1 and the delivery pipe 2 of the burners are associated with a valve mechanism comprising a valve seat 3 and a valve 4, suitable chambers being provided, as indicated at 5 and 6, into which the pipes 1 and 2 open. A by-pass duct 7 is provided around the valve and is controlled by means of the adjustable needle valve 8. The casting 9, within which the valve is positioned, has an extension 10 through which the valve rod 11 passes and has a rear threaded aperture 12. A plug 13, which may have a hexagonal portion, as shown in Figure 5, is screwed into the threaded aperture 12 and is provided with an opening 14 within which the rear extension 15 of the valve stem is positioned. A helical spring 16 is coiled loosely around the extension 15 and bears at one end against the plug and at the other end against the valve, in a manner tending to seat the valve.

The extension 10 is externally threaded and has a tapered end 17 cooperating with a correspondingly recessed portion of the casting 18, such casting being externally threaded and held to the extension 10 by means of the threaded sleeve 19. The casting 18 is provided with a longitudinally extending circuar hole 20 slightly larger than the valve stem 11. The outer or forward end of this hole is internally threaded, as indicated at 21, and receives a manually adjustable screw 22. This screw is provided at its inner end with a reduced extension 23 alining with the valve rod 11 and presenting, as does such valve stem, a flat bearing terminal surface. The outer end of the screw is fastened to a manually operable pointer 24 provided with a manipulating handle 25. A circular scale 26 is seated adjacent the outer end upon the casting 18 and is held in position by means of a screw 27. The scale has a series of legends 28 and corresponding graduations 29 marked thereon adapted to cooperate with the pointer to indicate the temperature at which the device is set, suitable stops 30 being provided, if desired, to limit the motion of the pointer.

The thermostatic cell adapted to operate the valve comprises a metallic tube 31, such as copper, and a ceramic bar 32, such as porcelain, for instance, mounted loosely therein. The bar 32 seats at its lower end upon an adjusting screw 33, such adjusting screw being threaded through the end cap portion 34 of the tube and locked to such cap portion by means of a lock nut 35, the cap portion being conveniently provided with a screw 36 passed through the metal tube 31 to retain it in position. The upper end of the bar 32 carries a metal plunger 37 seated within a circular recess formed in the extension 38 of the casting 18. This cell may be held in operative position relatively to the other portions of the device, by means of the union 39 whose conical surface 40 binds a flared portion 41 of the tube 31 to a correspondingly shaped face of extension 38 to thereby rigidly position a portion of the thermostatic device relatively to said valve seat. It will be seen from the mechanism thus far described that the thermostatic cell may be positioned within the oven or other heating device while the valve and its associated parts may be positioned externally of the oven. It will be seen, therefore, that variations in temperature cause the plunger 37 to move within its recess due to the different coefficients of expansion of the tube 31 and bar 32.

The mechanism for operatively connecting the three instrumentalities, namely, the valve rod, the manually adjustable screw, and the plunger 37, may comprise three steel spheres or balls 42, 43, and 44. The balls 42 and 43 are loosely mounted within the longitudinally extending hole 20 and bear against the opposed surfaces of the extension 23 and valve rod 11. The ball 44 bears against the other two balls and against the inner surface of the plunger 37. In practice, it has been found expedient to make the ball 44 larger than the other two and to mount such ball in an elongated opening 45, such opening communicating with both the hole 20 and the recess for the plunger 37.

The operation of the device is as follows:—The manually operable pointer is moved to the desired temperature, as indicated upon the dial 26, and the valve 4 is correspondingly moved away from its seat, thereby allowing the requisite quantity of gas to flow to the burner. When the desired temperature has been obtained within the oven, the thermostatic cell operates to shift the position of the ball 44 with respect to the balls 42 and 43, thereby correspondingly varying the position of the valve to control the flow of gas in strict accordance with the temperature within the oven and to limit the flow in accordance with the setting of the manually operable device. It is to be noted that the manually operable device alters the point of contact between the spheres and thereby alters the mechanical connection between the thermostatic cell and valve.

In the practice of this invention, it is contemplated providing a relatively long tube and bar for the thermostatic cell to secure the desired movement without subjecting the parts to excessive strains. The initial adjustment of the device may be accurately made by means of the screw 33 so that an exact operation may be had.

It is to be noted that the by-pass furnishes a small amount of gas when the valve is closed and thereby maintains the pilot light of the burners, such burners being of well known construction and adapted to be supplied both for the pilot light and main burner portion by means of the pipe 2.

It is to be noted, also, that the device may be readily positioned upon right and left hand ovens or where the position of pipes 1 and 2 may be different from that shown in the drawings.

It will thus be seen that a thermostatic control for ovens and similar heating devices has been provided, in which a rugged and simple construction has been attained and for which a relatively long life results.

Although one specific form of the invention has been described in considerable detail, it is to be understood that the invention may be embodied in different forms and such invention is therefore to be limited only as set forth in the appended claims.

I claim:—

1. A thermostat for controlling the fuel flow to heating devices comprising a valve seat, a value cooperating therewith and having a stem, a cell having a portion rigidly connected with said seat and a member movable relatively to said seat in accordance with temperature variations, contacting spheres adapted to wedge between said valve stem and said member, and manually operable means for varying the point of contact between said spheres.

2. A thermostat for controlling the flow of fuel to ovens comprising a valve seat, a valve cooperating therewith and having a valve stem, a tube adapted to be positioned within said ovens and operatively coupled to said seat, a bar positioned within said tube and operatively joined to said tube adjacent one end, a manually revoluble screw in alinement with said valve rod, and a series of spheres wedged between said valve rod, said screw, and the free end of said bar, said bar and tube having different coefficients of expansion.

3. A thermostat for controlling the flow of fuel to heating devices comprising a valve seat, a valve cooperating therewith and having a valve stem, a temperature responsive cell having a portion rigidly connected with said valve seat and having a relatively movable member, contacting spheres wedged between said member and said valve stem, manually controlled means for varying the point of contact between said spheres, and independent means for initially adjusting the said cell.

In testimony that I claim the foregoing I have hereunto set my hand at Milwaukee, in the county of Milwaukee and State of Wisconsin.

ANTHONY GEORGE SIEBENLIST.